United States Patent [19]
Sandstrom

[11] Patent Number: 5,517,349
[45] Date of Patent: May 14, 1996

[54] PROCESS AND A DEVICE FOR ERROR CORRECTION IN ACOUSTO-OPTIC DEFLECTION OF LIGHT BEAMS, PARTICULARLY OF LASER LIGHT

[76] Inventor: Torbjörn Sandstrom, Banvägen 56, S-43543, Mölnlycke, Sweden

[21] Appl. No.: 2,455

[22] Filed: Jan. 8, 1993

[30] Foreign Application Priority Data

Jan. 9, 1992 [DE] Germany .................. 42 00 374.1

[51] Int. Cl.$^6$ .................................................. G02F 1/33
[52] U.S. Cl. ................................... 359/313; 359/314
[58] Field of Search ......................... 359/313, 314

[56] References Cited

U.S. PATENT DOCUMENTS 3,799,652   3/1974   Torguet .................. 359/313

Primary Examiner—Georgia Y. Epps
Assistant Examiner—Thomas Robbins
Attorney, Agent, or Firm—Keck, Mahin & Cate

[57] ABSTRACT

A process and a device for compensating wave-front errors occurring in acousto-optical deflectors, with at least one auxiliary deflector which produces a deflected beam whose geometry is independent of the deflection angle and which counteracts the dependence of the deflected beam width on the deflection angle (FIG. 5).

18 Claims, 6 Drawing Sheets

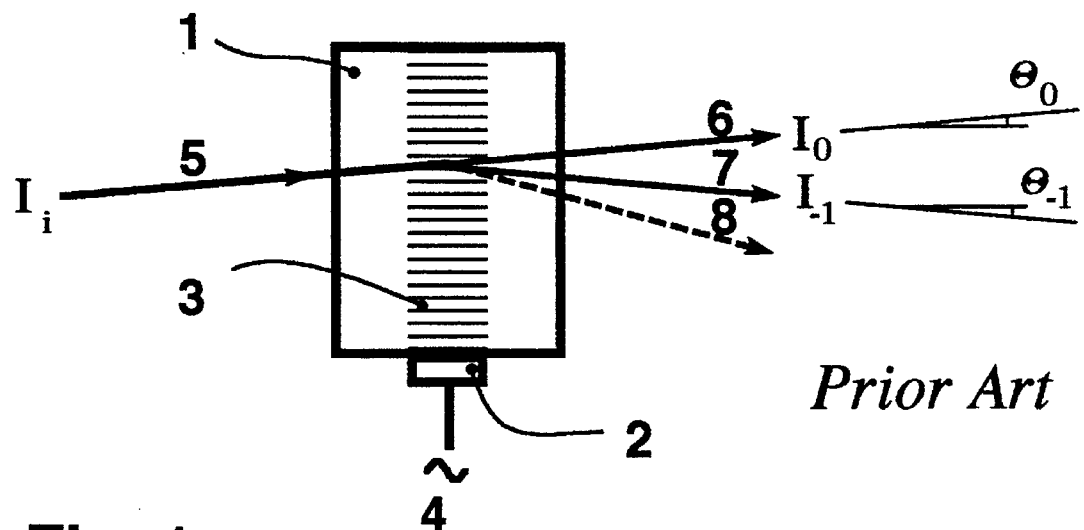
Fig. 1  *Prior Art*
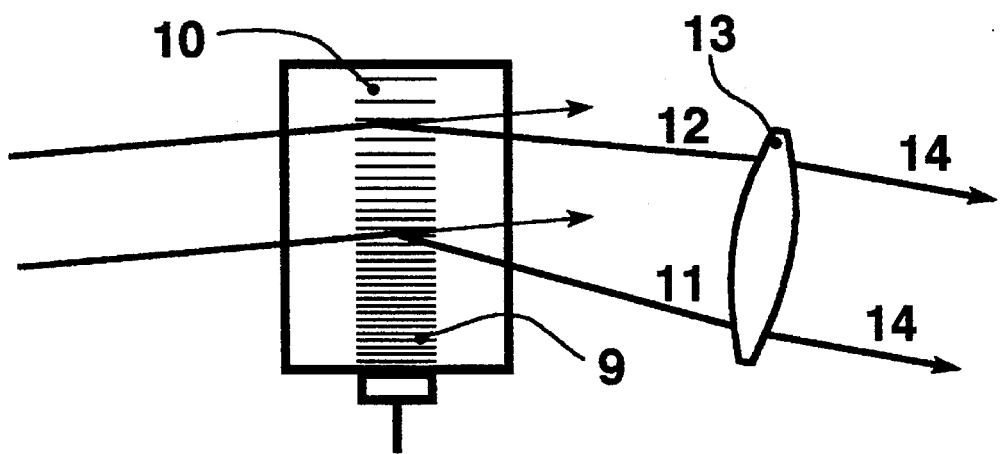
Fig. 2  *Prior Art*

PROCESS AND A DEVICE FOR ERROR CORRECTION IN ACOUSTO-OPTIC DEFLECTION OF LIGHT BEAMS, PARTICULARLY OF LASER LIGHT

FIELD OF THE INVENTION

The invention relates to a process and a device for correcting errors in acousto-optic deflection, particularly by means of acousto-optic diffraction. The invention may be applied particularly in laser ray scanning over surfaces to read or write patterns.

BACKGROUND OF THE INVENTION

It is known that a light beam can be deflected by the interaction with ultrasound waves inside a solid material. This phenomenon is called acousto-optic deflection. FIG. 1 depicts an acousto-optic modulator or scanner 1. The solid medium of this scanner can be a glassy material. In most technical applications, however, it is a crystal material. A radio-frequency signal is fed to a piezoelectric sound transducer (4) attached to the surface of the crystal (1). An ultrasonic beam (3) is launched in the crystal. The entering light beam (5) propagates through the transparent crystal material and exits partly as an undeflected light beam (6), partly as a deflected light beam (7). The deflection is produced by diffraction of the light at the lattice, which is deformed by the ultrasonic wave. With proper choice of the input angle $\textcircled{H}_o$ and the radio frequency most of the optical power $I_i$ of the input beam is coupled to the diffracted beam 7 with angle $\textcircled{H}_{-1}$ and optical power $I_r$. The indices stand for the so-called diffraction order. With the geometry shown, almost all of the input light is coupled to the diffraction −1 [minus one]. The optical power $I_0$ of the undeflected beam 6 is strongly attenuated.

The deflection follows the laws of optics and the angle of the deflected beam is controlled only by the relative wavelengths of light and ultrasound waves inside the crystal. This provides very precisely controlled deflection angles. An increase in the radio frequency gives a shorter sound wavelength and a deflected beam 8 with a larger deflection angle, as indicated by the broken line in FIG. 1. Since the frequency of a signal can be very accurately controlled, the deflection angle is also very accurately controlled.

Of special interest are those applications in which the radio frequency increases linearly with time. This results in deflection angles which grow in almost linear fashion with time over a given angle range. This deflection angle range is typically one to two degrees. An acousto-optic deflector operated in this way can be used in conjunction with focusing optics, so that a focus spot is created on the surface. The spot scans the surface with high speed and great precision, applying reading or writing information to the surface.

A well-known phenomenon in linear scanning is a cylinder-lens effect created by the scanner, as shown in FIG. 2. With an increasing ultrasound frequency the sound wave 9 that most recently left the transmitter has a higher frequency than the sound wave 10 that is further removed from the transducer 2. Thus the deflection angle of a beam segment 11 closer to the transducer is larger than the deflection angle of a beam segment 12 further away from the transducer 2. The magnitude of this effect depends on the scanning speed and can be compensated for by an external cylinder lens 13, with the result that a parallel beam 14 leaves the lens.

An acousto-optic deflector can be simply depicted, as in FIG. 1. Employed is an optically isotropic medium like dense flint glass. One of the deflector's important parameters is the useful scanning-angle range, often expressed as the useful band width of the coupled RF signal. Coupling to the deflected beam is efficient within this range. The undeflected beam Io is strongly attenuated. Outside of the useful range the coupling is weaker and the beam, though deflected by means of diffraction, retains only a small portion of the input optical power, i.e. $I_{-1} \ll I_i$. The coupling efficiency as a function of angle is shown in curve 15 of FIG. 3 for a simple deflector with an isotropic medium.

From the IEEE Transactions on Sonics and Ultrasonics, Vol. SU-23, No. 1, pages 2–22 (1976), I. C. Chang, "Acousto-optic Devices and Applications" it is known that the optical anisotropy of certain crystals can be used to increase the useful angle range, as is shown in curve 16 of FIG. 3. A frequently used medium is paratellurite ($TeO_2$), which is strongly anisotropic. This publication also discloses a method to further enlarge the useful range of deflection by cutting the optically anisotropic crystal at an angle to the optical axis 18, FIG. 4. This results in an enlarged efficiency curve 17 (FIG. 3) for the angle range.

Also known for such off-axis devices is a phenomenon called acoustical walk-off. For some crystals the velocity of sound in a given direction is greater than in a direction perpendicular thereto. In $TeO_2$ this effect is very highly pronounced. The sound velocity is 617 m/s in the [1,1,0] crystal direction and 4200 m/s in the [0,0,1] crystal direction. When the piezoelectrical transducer is mounted at a slight angle to the crystal axis, the beam propagates in both of these directions. Propagation is significantly faster in the one direction, however. The result is that the sound wave's direction of propagation is not perpendicular to the transducer, but instead runs in a direction 18 more inclined towards the fast axis. The angle to the normal direction of the transducer is called the walk-off angle. In $TeO_2$ the walk-off direction can be 45° or more. The wave planes always run parallel to the transducer, i.e., the walk-off phenomenon does not change the angle of the input beam to be chosen for best efficiency. It takes effect only at that place within the crystal where there is interaction between acoustic wave and lightwave.

If the acousto-optic scanning procedure is operated close to its limits by increasing the usable angle range and increasing the scanning speed, wavefront errors in the deflected beam will result that make it impossible to get a good focus spot across the entire scan. The primary errors are curvature of the best focus plane and coma. The result is deteriorated contrast and definition in the direction along the scan.

SUMMARY OF THE INVENTION

The goal of the invention, therefore, is to create a process and a device of the initially described type, in which errors in the focus spot are eliminated, even over an enlarged usable angle range and at an increased scanning speed.

The invention provides a process to compensate for wavefront errors, particularly in acousto-optic deflectors with fast scanning and large walk-off angles. Error compensation is based on an auxiliary passive deflection in a deflection plane which, in the case of writing, lies behind the interaction plane between the sound-wave field and the light ray. In the case of reading, the light is propagated in the opposite direction. It is possible to design the geometry of the deflected beam independent of the scanning angle and scanning speed. An auxiliary deflection device designed only in dependence on the deflection properties may be added to a given deflector. Auxiliary deflection provides compensation for the interaction errors to a degree such that the completed scanning optics are limited to diffraction. The geometry of the auxiliary deflection means can be chosen to compensate for the dependence of the light beam width on the deflection angle (scanning angle), as determined by the geometry of the interaction plane in the deflector. The geometry of the auxiliary deflection device can be further optimized in dependence on the geometric ray tracing.

The invention thus discloses a process and a device for compensating wavefront errors in an acousto-optic deflector, with at least one auxiliary deflection means which produces an acousto-optically deflected beam with a geometry independent of the deflection angle and which counteracts the dependence of the deflected beam width on the deflection angle (scanning angle).

The attached figures serve to elucidate the invention. Shown in the figures are:

BRIEF DESCRIPTION OF THE FIGURES

FIG. 1 is a schematic representation of an acousto-optic deflector known in the prior art FIG. 2 shows the scanning of a wide beam by means of a linearly increasing frequency depicting the cylinder effect in an acousto-optic deflector known in the prior art device or light deflector

DETAILED DESCRIPTION OF THE PREFERRED EMBODIMENTS

The invention is based on the knowledge that the most important geometric effect causing errors is the dependence of the width of the deflected beam on the deflection angle. The beam is "bent" in the interaction plane, i.e., in the center of the acoustic wave field. If this plane is not perpendicular to the deflected beam, the width of the deflected beam is dependent on the deflection angle. This effect is most pronounced in the case of large walk-off angles.

Figure 3:
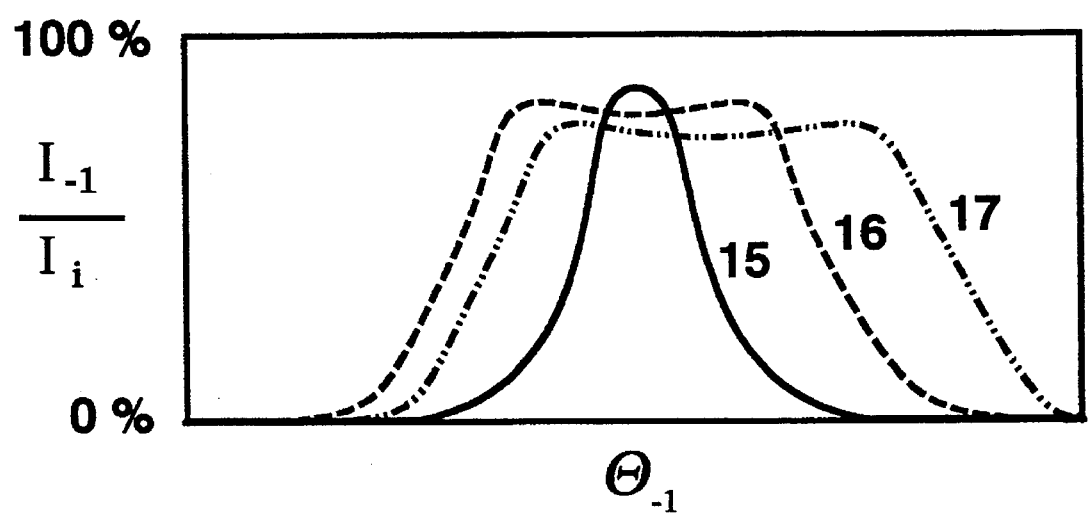
FIG. 3 shows plotted curves to explain the enlarged angle range in optically anisotropic crystals and in off-axis operation.
Figure 4:
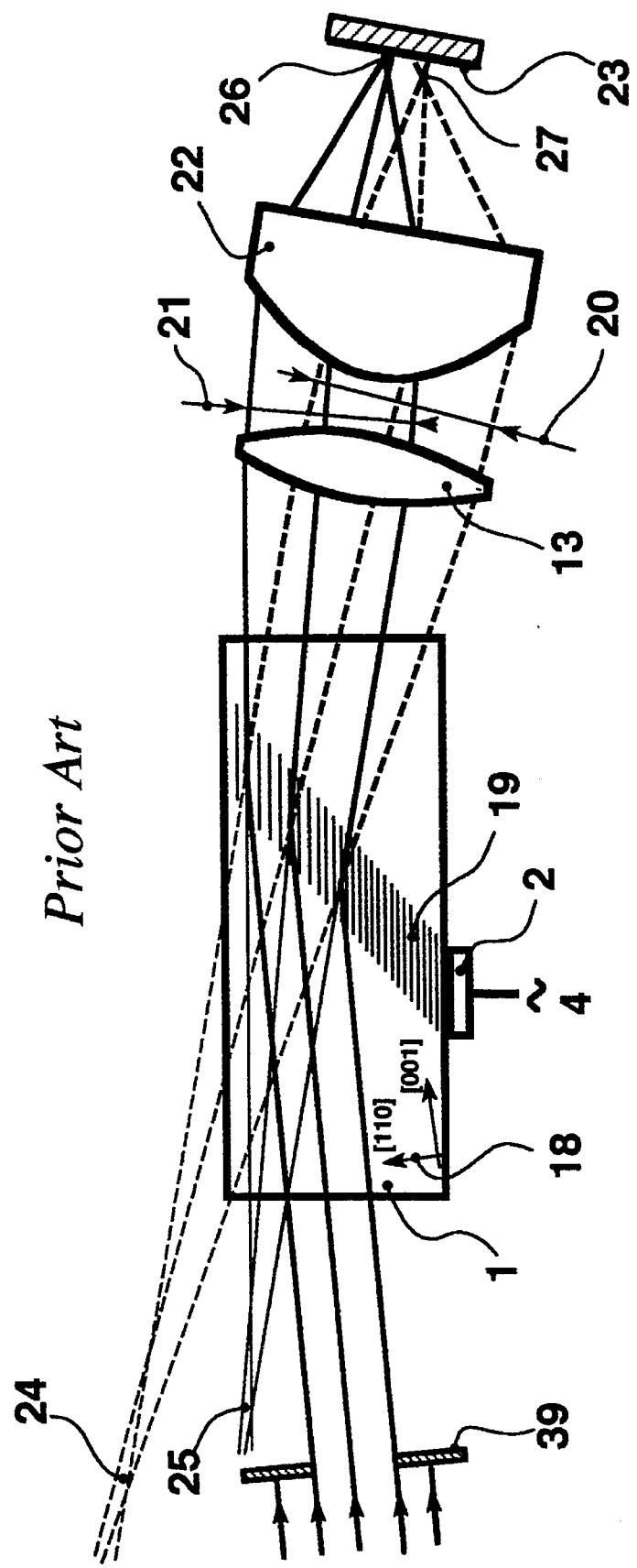
FIG. 4 shows a representation of error generation in a scanner with focussing optics of the prior art.

FIG. 4 shows this in greater detail through analysis by ray tracing. For the sake of simplicity the refraction occurring at the surface of incidence and the exit surface of the deflector crystal is not shown, although it is included in the calculations. The beam is deflected by a deflector (scanner) running at high speed with a periodically rising frequency. The cylinder effect explained above causes the light to diverge, and a cylinder lens 13 straightens the light into a parallel beam. The parallel beam is focussed by the objective lens onto a flat surface 23 perpendicular to the axis of the objective lens. The solid lines show the central and peripheral rays of the beam, as defined by aperture 39, at time $t_1$, and the broken lines show the same rays at a later time $t_2$. At time $t_2$ the deflection angles of all of these rays, i.e., the peripheral rays and the central ray, are larger. To be sure, detailed analysis shows that the angles between the rays change a negligible amount from time $t_1$ to time $t_2$. Still, because of the larger angle to the interaction plane 19 the rays cover a wider area at time $t_2$, and the beam diameter 20 at time $t_2$ is consequently larger than the beam diameter 21 at time $t_1$. The beam diameters 20 and 21 are recorded immediately after leaving the cylinder lens 13, as FIG. 4 shows. The position 24 of the imaginary light source from which they appear to emanate is further from the lens 13 at time $t_2$ than the position 25 of the imaginary light source at time $t_1$. The combination of cylinder lens 13 and objective lens 22 projects images of the imaginary points 24 and 25 on the surface 23. The difference in distance is translated into a shift in focus. A more precise analysis for a single point in time shows these errors to occur even for individual rays in the light beam. There are thus wavefront errors within a single beam, and the foci 26 and 27 are not perfect.

The mechanism for a perfect linear frequency-time dependence can be simply described. The two peripheral rays which pass the edge of the aperture 39 define the width of the incoming ray. The peripheral rays strike at the same points in the interaction plane. The distance between these points remains constant during scanning. The sonic speed of the material is constant. Thus from one point to another there is a constant time delay for the progressing sound wave. With a linear frequency increase there is a constant frequency difference between the two points. The deflection angle is an almost exact linear function of the frequency, and a linear frequency dependence yields a constant difference for the deflection angle between the two peripheral rays, i.e., the two peripheral beams form an acute angle which remains constant during scanning.

As can be seen in FIG. 4, the points 24 and 25 which emit virtual light can be constructed graphically from the peripheral rays for the divergent beams, given the two different deflection angles. The virtual points 24 and 25 are projected from the lenses 13 and 22 onto the surface 23. To focus the two points on the surface 23 it is necessary for them to stand at the same distance from the lens 13. This is not the case in prior art, however, as FIG. 4 shows. Analysis reveals that the distance of the cylinder lens 13 from the site of the given virtual point changes during deflection due to the change in the beam width after the acousto-optical interaction. At time point $t_2$ the virtual point 24 is further away from the cylinder lens 13 than virtual point 25 at time point $t_1$. This results in a change in the given foci on the surface 23. If more than two rays are observed, it is evident that these rays do not intersect at the same point, i.e., in identical points 24 and 25 emitting virtual light. These points are thus blurred. Even with refocussing it is therefore impossible to obtain a perfect focus point anywhere on the surface 23.

This phenomenon arises in an increased degree at high walk-off angles and high scanning speeds. To reach the ultimate scanning throughput for a particular deflector material and device size it is necessary to increase the band width of the coupled radio frequency or the angle range of the deflection angle. This can be achieved by using a high walk-off design and by scanning at high speed, though a pronounced cylinder effect also results. Without the correction provided by the present invention the deflector system will be inoperable due to wavefront errors and large foci.

Figure 5:
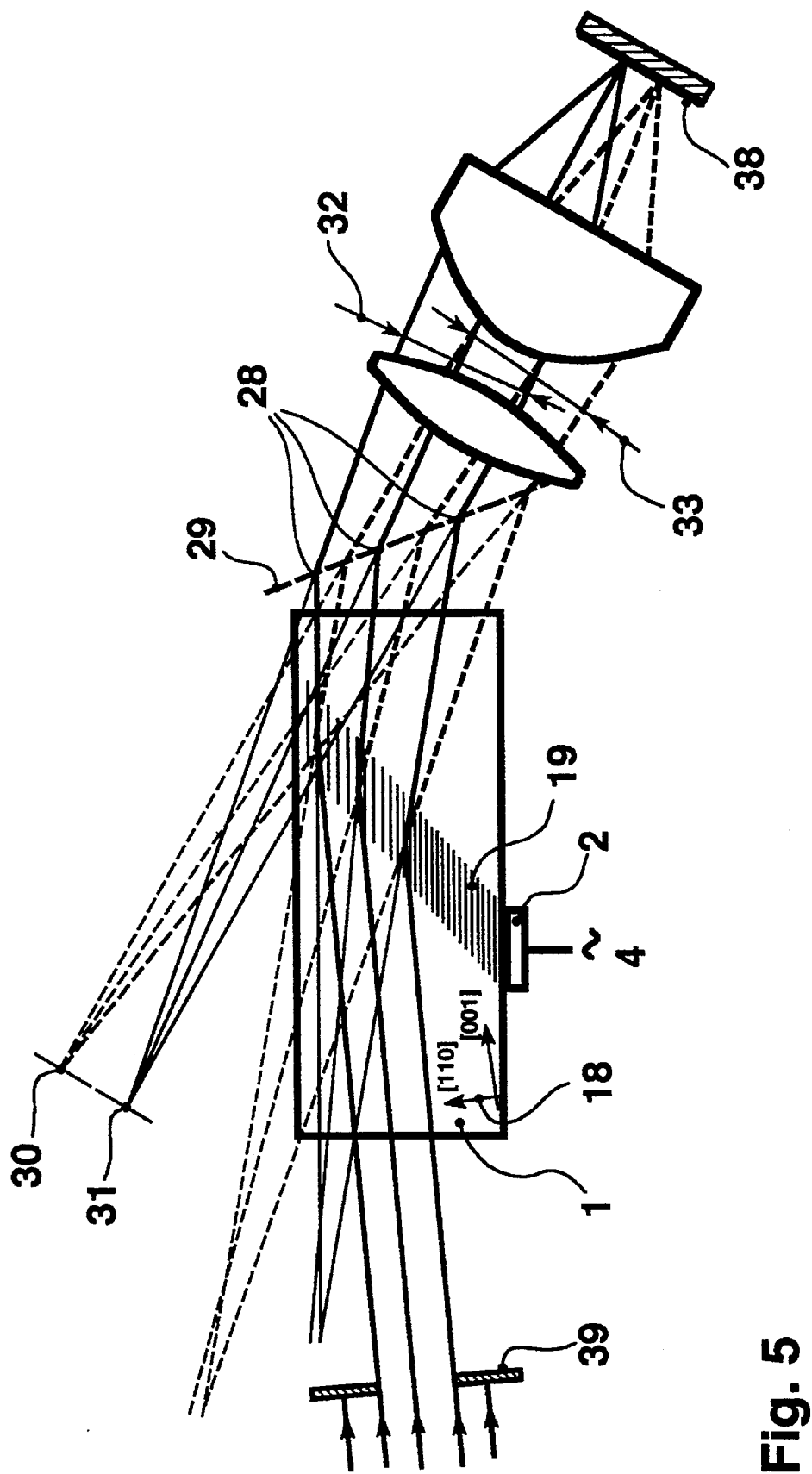
FIG. 5 shows schematically the correction of the errors depicted in the prior art of FIG. 4 by the inclusion of the deflection plane of the present invention.

In the invention the geometrical errors are compensated by a second auxiliary deflection 28 in a deflection plane 29, as shown schematically in FIG. 5. This provides a reversed angle-dependence of the beam width. As shown in FIG. 5, an auxiliary deflection 28 is provided at a given angle in a deflection plane 29, the auxiliary deflection being independent of time or the deflection angle and independent of the scanning speed. This compensates for the geometric errors that arise from the geometry of interaction between the beam and the acoustic wave field. The beam diameters 32 and 33, which are reached at different times, will be essentially equal and constant during the scan, for example a scan line. A new set of imaginary emanating points 30 and 31 will be created in a plane perpendicular to the optical axis of the cylinder lens 13 and objective lens 22. I.e., the imaginary light-source points lie at an equal distance from the cylinder lens 13 or the objective lens 22. The wave-front errors in the beam are reduced, such that the foci produced by the objective lens 22 have a perfect form and lie in the plane of the flat surface which coincides with the focus plane. The optimum deflection geometry for auxiliary deflection 28 in the deflection plane 29 results from the special design of the deflector system and consists of the modulator crystal 1 and the sound transducer 2. Since the deflection effect is independent of time and speed, it can be determined from the properties of the deflector alone at the time the deflector is designed.

FIG. 6 shows four embodiments of the auxiliary deflection 28 (FIG. 5).

Figure 6A:
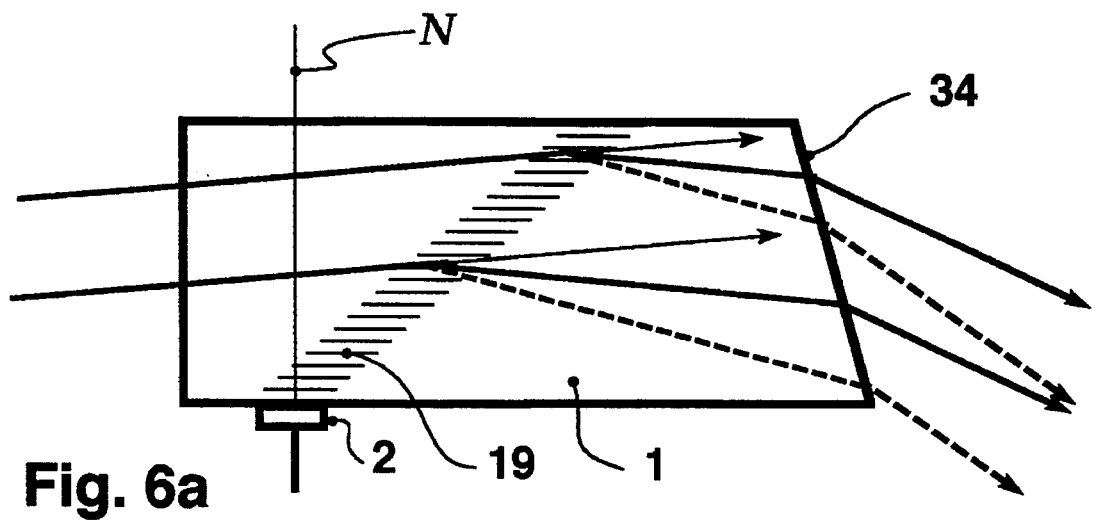
FIGS. 6a to 6d shows four embodiments of error correction structures according to the present invention.

As shown in FIG. 6a, the auxiliary deflection can be realized by correctly dimensioning the angle of the exit face 34, particularly the interface of the crystal 1 relative to the surface normal N of the radiation surface of the transducer 2; the angular tilt of the exit face 34 runs opposite to the walk-off angle.

Figure 6B:
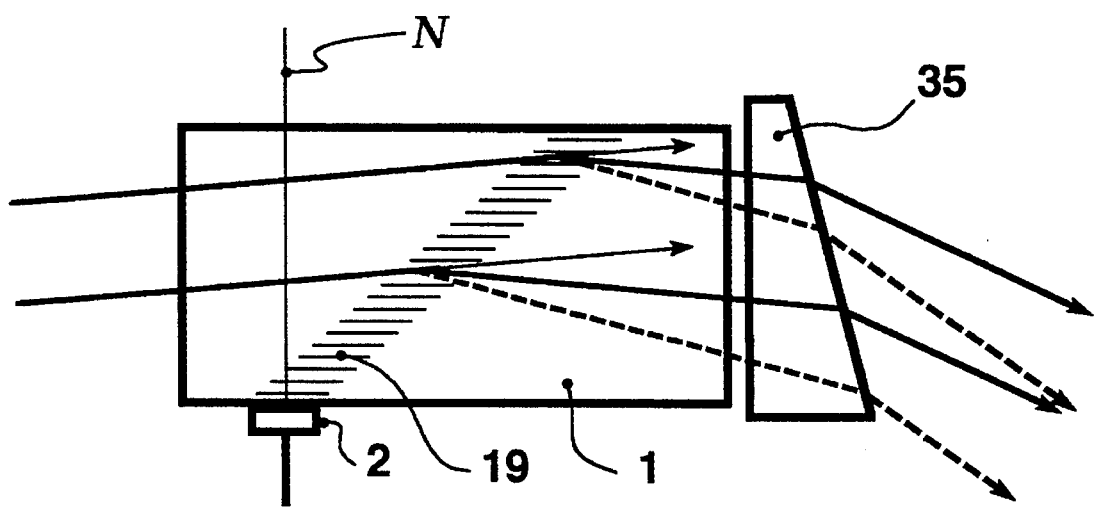

In the embodiment of FIG. 6b the auxiliary deflection is realized by means of a prism 35, in which the exit face from which the beam issues exhibits an angle of intersection that is selected as in FIG. 6a.

Figure 6C:
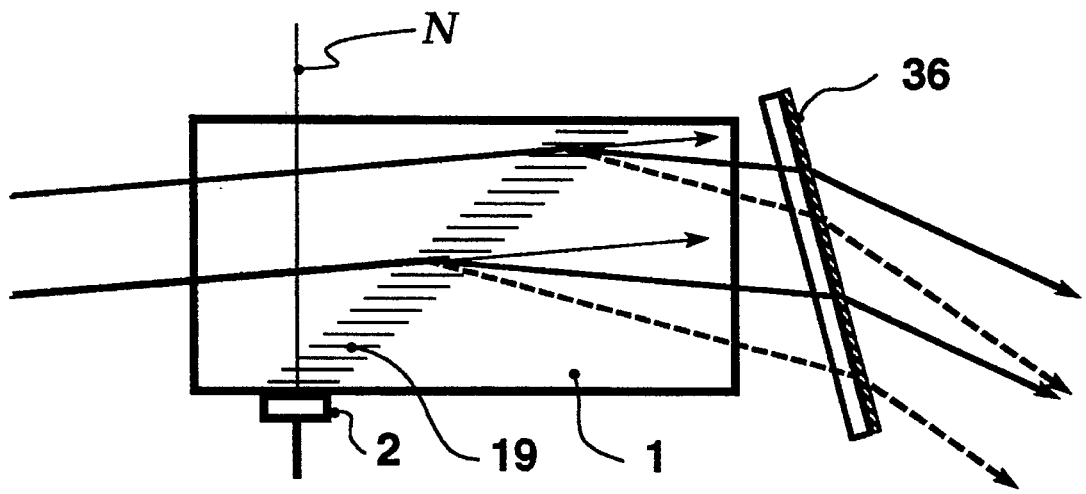

In FIG. 6c the auxiliary deflection is achieved by means of an optical diffraction device 36 in the form of a coated plate with properties similar to those of a prism. The coating of the transparent plate contains diffracting microstructures.

Figure 6D:
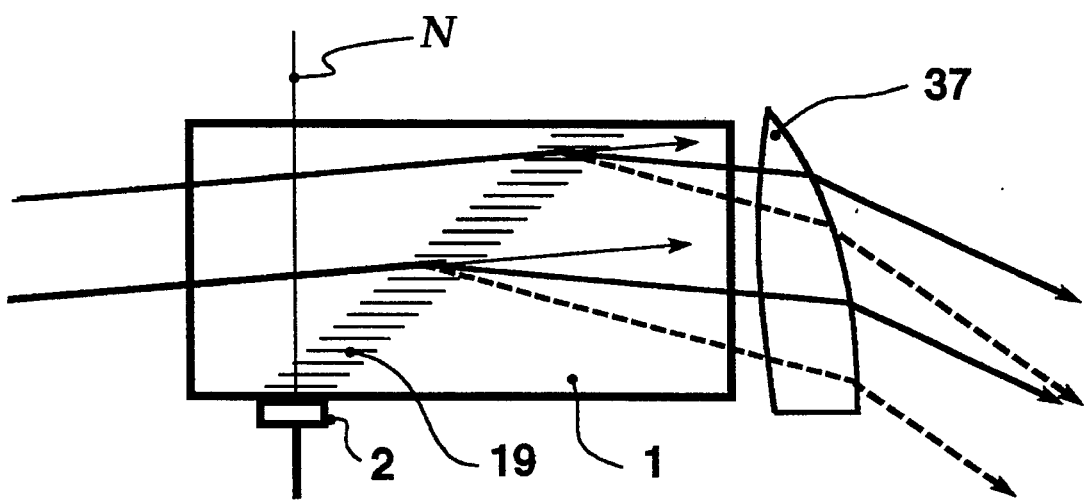

In the embodiment shown in FIG. 6d, error correction is achieved by means of a uncentered cylinder lens 37, again with a refractive effect at the border area where the ray leaves the cylinder lens 37.

With the exception of the embodiment shown in FIG. 6d, in which the cylinder lens effect is compensated by the cylinder lens 37, the cylinder lens 13 and the final lens 22 combine with the beam-producing system.

It is also possible to employ a combination of the above deflection systems to produce the auxiliary deflection 28. For example, the prism may be cemented to the crystal. Various prisms may be employed. In addition, the prism 35 or the diffraction device 36 may be combined with the cylinder lens 13.

The input angle to be selected for the beam transmitted through the crystal 1 is chosen from within a predetermined usable angle range. This angle depends only on the physics of interaction between the beam and the acoustic wave field in the crystal, and on the crystal type, the wavelength, and the angle of the coupled sound transducer 2 relative to the crystal axes.

Propagation through the modulator crystal 1 obeys Snell's law of refraction at border surfaces. The deflection angle in the acousto-optic interaction follows the phase-matching and/or impulse conservation laws known from the above-indicated publication in the IEEE Transactions on Sonics and Ultrasonics. The RF frequency relative to the position in the focal plane 38, or relative to the angle if the beam is not focussed, is determined by tracing the central ray in the input aperture. The frequency vs. time function is then computed for the desired position or angle according to time. Typically this is a linear function. The derived frequency-time function may be linear. However, it may also have a slight non-linearity to compensate for distortion in the lens or other errors. With the frequency-time relation determined for one point, the frequency-time dependence at any location in the aperture is known, since the acoustic wave propagates at a known speed. It is now a straightforward procedure to trace several rays spread over the entire aperture 39 at different times during the scanning cycle.

The parameters for the auxiliary deflection needed for optimum correction are found by assuming the appropriate deflection design according to the examples given FIGS. 6a to 6d, before tracing the rays and determining the parameters empirically or by using an iterative search algorithm. This can be done with the aid of a computer.

The following describes a preferred embodiment.

A deflector (scanner) representing an invention embodiment has an interaction medium in the form of a crystal, e.g., a $TeO_2$ crystal cut at 7°. The acoustic walk-off angle is 39°. The useful RF range is 100–170 MHz at a wavelength of 442 nm. At an FR power of 0.8 W, more than 70% of the incident light in the deflected beam appears within the usable scanning angle range of 2.6°. The aperture is 3 mm in the scanning direction. The maximum throughput expressed in resolved pixels per second gives a scanning cycle of 9 microseconds at a frequency ramp of 7.7 MHz per microsecond.

According to classical theory, a 442 nm laser beam with a diameter of 3 mm will produce a spot with a half-intensity radius of 0.75 μm when focussed with a lens of focal length 10 mm. A geometrical ray-trace shows that individual rays miss the perfect focus by 1 μm laterally. This means that they fall well outside the half-intensity radius. The focus-shift can be compensated to some extent by a tilt of the surface 23 on which the spot is produced. Still, the tilt depends on the scanning speed, and there remains a considerable amount of uncompensated coma.

Use of the invention makes it possible to avoid an impermissible degree of focus displacement and coma. In the examples shown in FIG. 6a this is achieved by inclining the exit face of the modulator crystal 1, for example, by cutting at an angle of 4.6 degrees from the normal N of the radiation surface of the transducer 2a. This will compensate the geometrical errors to a high degree. The focus shift is removed and all deflected rays fall within 0.03 μm of the central ray. This compensation is sufficient to make the optics completely diffraction-limited even in the most demanding applications.

While in existing deflectors the ray width increases monotonously with the deflection over the entire scanning range, the maximum achieved for a diagonally inclined exit face, particularly at 4.6°, in the example shown in FIG. 6a and with the above-indicated values for the interaction crystal lies precisely in the center of the range. This shows that the maximum in the beam center provides a simpler design criterion than a full ray-trace.

As can be seen in FIGS. 6a to 6d, the exit face of the additional deflection means 34, 35, 36, 37 runs at a oblique angle to the surface normal N of the radiation area of the transducer 2. The exit face here runs opposite to the beam's direction of propagation or to the tilt of the walk-off angle.

There are several ways to orient the crystal and position the sound column. The frequency of the sound wave can increase or decrease during a scan. The invention compensates for errors caused by the walk-off of the acoustical wave-field The compensation works independent of the orientation of a given acousto-optical device. Likewise, the compensation is independent of small deviations from a linear relation between the RF frequency and time, as used to compensate for distortion in the final focusing lens. Furthermore, error compensation according to the invention is achieved independently of any mirrors or other direction-changing devices positioned after the acousto-optic deflector. When the deflector is used for reading information, the direction of the light propagation is reversed and the input and output arrangements for the acousto-optic deflector are reversed.

What is claimed is:

1. A process for correcting errors in light beam deflection by means of acousto-optic diffraction comprising:

interacting a light beam and a sound-wave field on an interaction plane formed at an oblique angle to wave planes of the sound-wave field within a surrounding medium;

focusing the deflected beam on a target surface;

providing at least one beam deflection on a scanning side of the acousto-optic interaction plane, and providing a reversed angle-dependence of beam width of the deflected beam to compensate for that caused by acousto-optic deflection in the oblique interaction plane.

2. A process according to claim 1, wherein the acousto-optic deflection is driven by a radio frequency signal with a frequency having a linear time dependence.

3. A process according to claim 1, wherein at least one of the beam deflections is caused by refraction at a interface between the medium in which acousto-optic diffraction occurs and a surrounding medium.

4. A process according to claim 1, wherein at least one beam deflection is caused by refraction in a prism.

5. A process according to claim 1, wherein at least one beam deflection is caused by diffractive microstructures.

6. A process according to claim 1, wherein at least one beam deflection employs a lens that is uncentered relative to the optical axis of the deflected beam.

7. A process according to claim 1, wherein the beam deflection is caused by a combination of refraction and diffraction.

8. A process according to claim 1, wherein the deflected beam is focussed on the side of the auxiliary deflection facing away from the acousto-optic deflection medium.

9. A process according to claim 1, wherein a pattern is written with the deflected beam.

10. A process according to claim 1, wherein a pattern is read with the deflected beam.

11. An acousto-optic scanning device with a high degree of correlation at high scanning speeds, comprising:

an anisotropic interaction crystal;

a radio frequency transducer creating a sound field within said crystal;

an interaction plane forming an oblique angle to wave planes of the sound field; and an auxiliary deflection element on a scanning side of the interaction plane, said auxiliary deflection element providing an inverse angle-dependence of beam width to that caused by the acousto-optic deflection in the oblique interaction plane, wherein the deflected beam is focused on a target surface.

12. A device according to claim 11, wherein the auxiliary deflection element exhibits at least one refractive interface between the crystal and the surrounding medium.

13. A device according to claim 11, wherein the auxiliary deflection element comprises a refracting prism.

14. A device according to claim 11, wherein the auxiliary deflection element comprises a diffractive device with diffractive microstructures.

15. A device according to claim 11, wherein the auxiliary deflection element comprises a lens that is uncentered relative to the optical axis of the deflected ray.

16. A device according to claim 11, wherein the auxiliary deflection element comprises a combined refractive and diffractive device.

17. A device according to claim 11, wherein the refractive interface of the auxiliary deflection element is tilted relative to the normal of the radiation surface of the transducer and at an angle opposite to that of the propagation direction of the sound-wave field relative to said normal.

18. A device according to claim 11, wherein the acousto-optic deflector is operated by a radio frequency signal frequency having a linear time dependence.

* * * * *